US005513836A

United States Patent [19]

[11] Patent Number: 5,513,836

[45] Date of Patent: May 7, 1996

Hillenburg

[54] CLAMPING DEVICE FOR HOLDING DOORS, PANELS AND THE LIKE IN AN UPRIGHT POSITION

[76] Inventor: Jerry Hillenburg, 8195 Whiteland Rd., Martinsville, Ind. 46151

[21] Appl. No.: 332,584

[22] Filed: Oct. 21, 1994

[51] Int. Cl.$^6$ ........................ B23Q 3/02

[52] U.S. Cl. ........................ 269/101; 269/157; 269/133; 269/233

[58] Field of Search ........................ 269/133, 233, 269/95, 101, 157

[56] References Cited

U.S. PATENT DOCUMENTS

| | | | |
|---|---|---|---|
| 342,187 | 5/1886 | Cornell . | |
| 708,238 | 10/1902 | Lucabaugh . | |
| 771,753 | 11/1904 | Stanley . | |
| 1,055,937 | 5/1913 | Mitchell . | |
| 1,127,833 | 2/1915 | Von Hiddessen . | |
| 1,345,177 | 6/1920 | Heckathorn . | |
| 1,954,599 | 4/1934 | Rippen | 269/233 |
| 2,605,795 | 8/1952 | Tracy . | |
| 2,830,632 | 5/1958 | La Rouche . | |
| 3,322,422 | 5/1967 | Harvill | 269/133 |
| 4,391,437 | 7/1983 | Collins . | |
| 4,618,131 | 10/1986 | Campisi et al. | 269/233 |
| 5,169,132 | 12/1992 | Myers et al. | 269/233 |

FOREIGN PATENT DOCUMENTS

| | | | |
|---|---|---|---|
| 1194047 | 9/1985 | Canada | 269/133 |

*Primary Examiner*—Robert C. Watson
*Attorney, Agent, or Firm*—Locke Reynolds

[57] ABSTRACT

A clamping device is disclosed for holding doors, panels and similar generally planar workpieces in an upright position while the device is attached to a stationary or movable support. Automatic clamping of a workpiece is accomplished by placing the workpiece on a support member and in contact with a movable member, with the weight of the workpiece causing diagonal sliding movement of the workpiece and movable member towards a stationary member. The workpiece is released by lifting the workpiece, with a coil spring urging the movable member diagonally away from the stationary member.

11 Claims, 2 Drawing Sheets

CLAMPING DEVICE FOR HOLDING DOORS, PANELS AND THE LIKE IN AN UPRIGHT POSITION

BACKGROUND OF THE INVENTION

1. Field of the Invention

The present invention generally relates to devices for clamping doors, panels and similar generally planar workpieces in an upright position during fitting, trimming, lock and hinge installation and similar operations, and more particularly concerns devices that are capable of holding generally planar workpieces of various sizes in an upright position and that act in an automatic manner to clamp and unclamp such workpieces.

2. Description of the Prior Art

The array of devices that may be used to clamp doors, panels and similar workpieces in an upright position includes freestanding devices that are supported by stabilizing bases such as those described by U.S. Pat. Nos. 342,187, 708,238, 771,753, 2,605,795, 2,830,632, and 3,322,422. In addition, there are clamping devices that attach to a workbench, doorframe, window sill, post or other stationary object such as those described by U.S. Pat. Nos. 1,055,937, 1,127,833, and 1,345,177. The array of devices may also be characterized as including those devices where the clamping action occurs through a pincers-type movement of the device simultaneously pressing against both sides of the workpiece, such as those described by the devices of U.S. Pat. Nos. 342,187, 771,753 and 2,605,795, and by those devices utilizing a one-side clamping movement such as those described by devices of U.S. Pat. Nos. 708,238, 1,345,177, 2,830,632, and 3,322,422. Further, the clamping of the workpiece may be accomplished in a variety ways, including a latching mechanism such as that described by the device of U.S. Pat. No. 708,238, by pressure exerted by a screw such as that described by the device of U.S. Pat. No. 1,345,177, by the weight of the workpiece such as that described by the device of U.S. Pat. No. 342,187, by a swinging jaw or jaws such as those described by the devices of U.S. Pat. Nos. 2,605,795 and 2,830,632, or by a diagonally movable jaw such as that described by the device of U.S. Pat. No. 3,322,422. Unclamping of the workpiece may be accomplished by the use of a lever such as those described by the devices of U.S. Pat. Nos. 2,830,632 and 3,322,422, by removing the weight of the workpiece as described by U.S. Pat. No. 342,187, or by manually loosening a screw or latching mechanism.

Despite the availability of such devices, there exists a need in the art for a clamping device for holding doors, panels and the like in an upright position that is capable of attachment to and use with both stationary and movable supports, is capable of automatically clamping and releasing a workpiece without the need for separate latching, clamping or releasing operations, yet is sturdy, compact, lightweight, has a minimum number of components, is easily maintained, and is inexpensive to produce.

SUMMARY OF THE INVENTION

In order to aid in the understanding of the present invention, it can be stated in essentially summary form that it is directed to a clamping device that is capable of holding doors, panels and similar generally planar workpieces in an upright position while the present invention is attached to a stationary or movable support, yet is capable of automatic clamping by placing the workpiece in contact with the present invention, and of automatic release by removing the workpiece from the present invention.

It is an object of the present invention to provide a clamping device that is capable of holding in an upright position doors, panels and similar generally planar workpieces of various sizes and weights.

It is another object of the present invention to provide a clamping device that is capable of automatic actuation to securely hold in an upright position doors, panels and similar generally planar workpieces.

It is another object of the present invention to provide a clamping device for holding doors, panels, and the like in an upright position that is capable of automatic release of workpieces.

It is another object of the present invention to provide a clamping device for holding doors, panels and the like in an upright position that is capable of being mounted to a wide variety of stationary or movable supports.

It is another object of the present invention to provide a clamping device for holding doors, panels, and the like in an upright position that is capable of being mounted to a wide variety of movable objects normally present at a worksite, obviating the need for separate transportation of the present invention to a worksite.

It is still another object of the present invention to provide a clamping device for holding doors, panels, and the like in an upright position that is sturdy, compact, and lightweight, yet is inexpensive to produce.

It is yet another object of the present invention to provide a clamping device for holding doors, panels and the like in an upright position of relatively simple construction with a minimum of components.

Further objects and advantages of the present invention will be apparent from a study of the following portion of the specification, the claims, and the attached drawings.

DESCRIPTION OF THE PREFERRED EMBODIMENT

The following portion of the specification, taken in conjunction with the drawings, sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Figure 1:
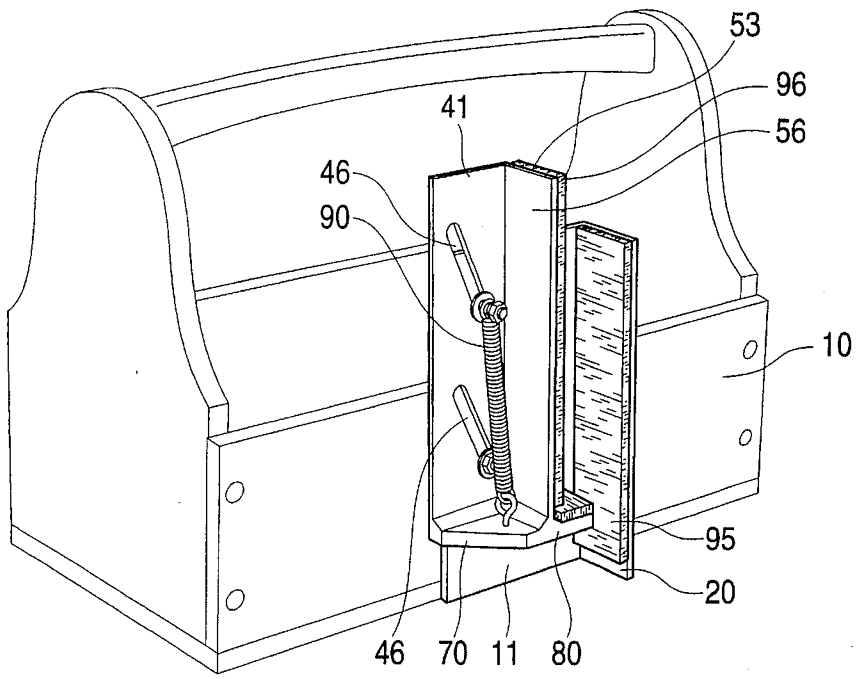
FIG. 1 is a perspective view of a clamping device for holding doors, panels and the like in an upright position representing the present invention, shown as attached to a portion of a tool box.
Figure 2:
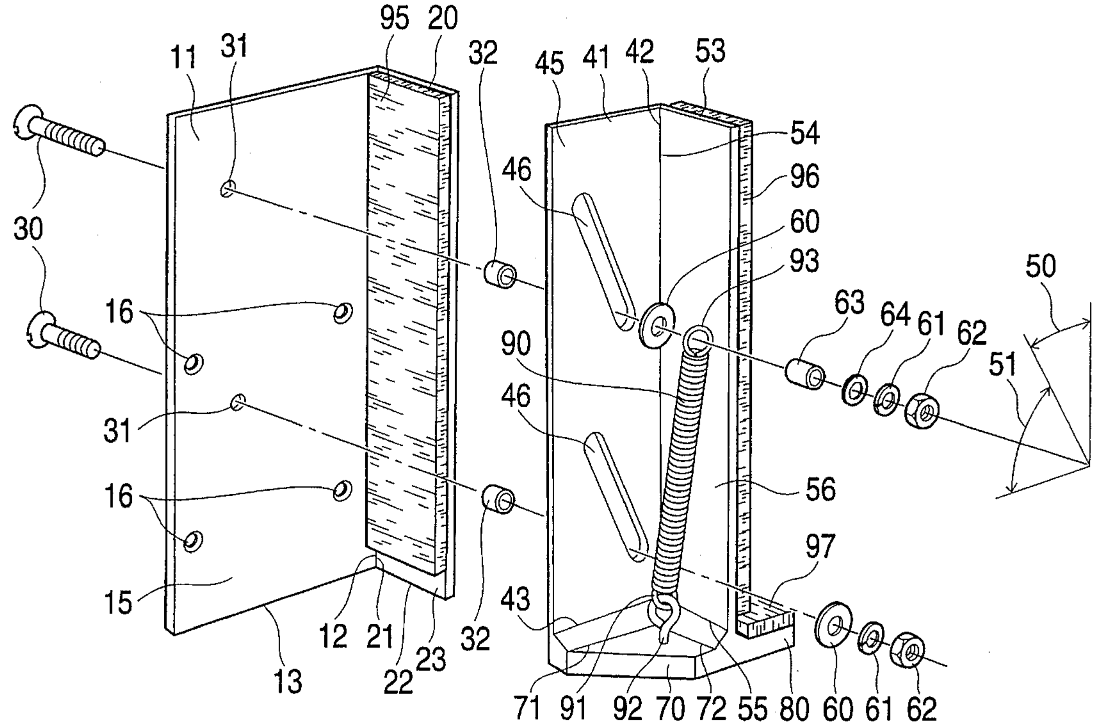
FIG. 2 is an exploded perspective view of a clamping device for holding doors, panels and the like in an upright position representing the present invention.
Figure 3:
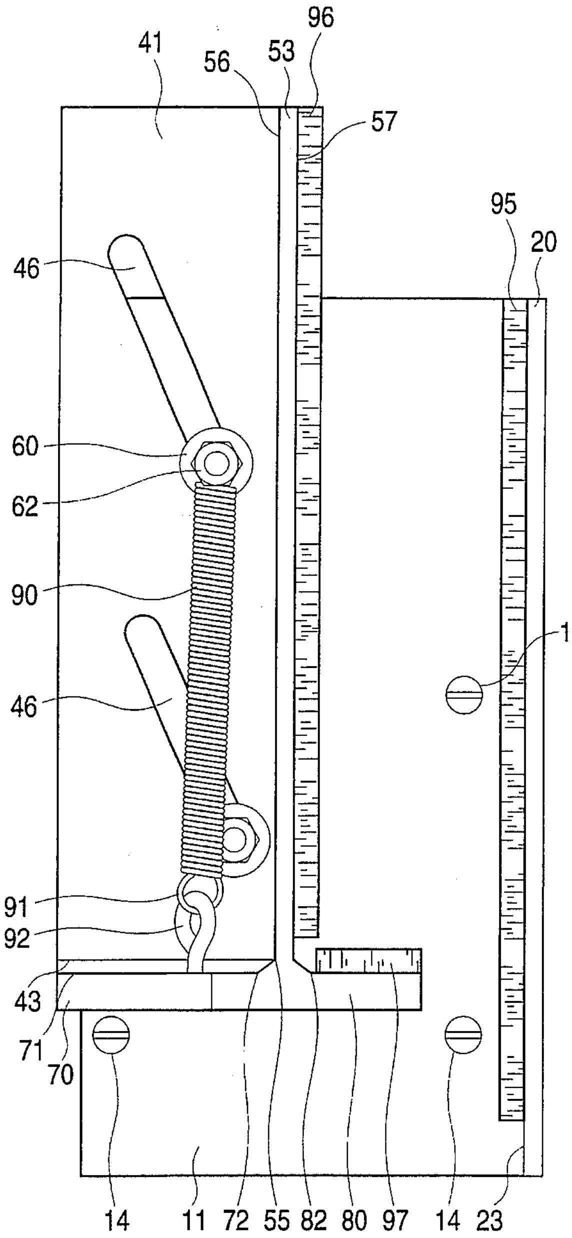
FIG. 3 is a front view of a clamping device for holding doors, panels and the like in an upright position representing the present invention in the unactuated, open position.
Figure 4:
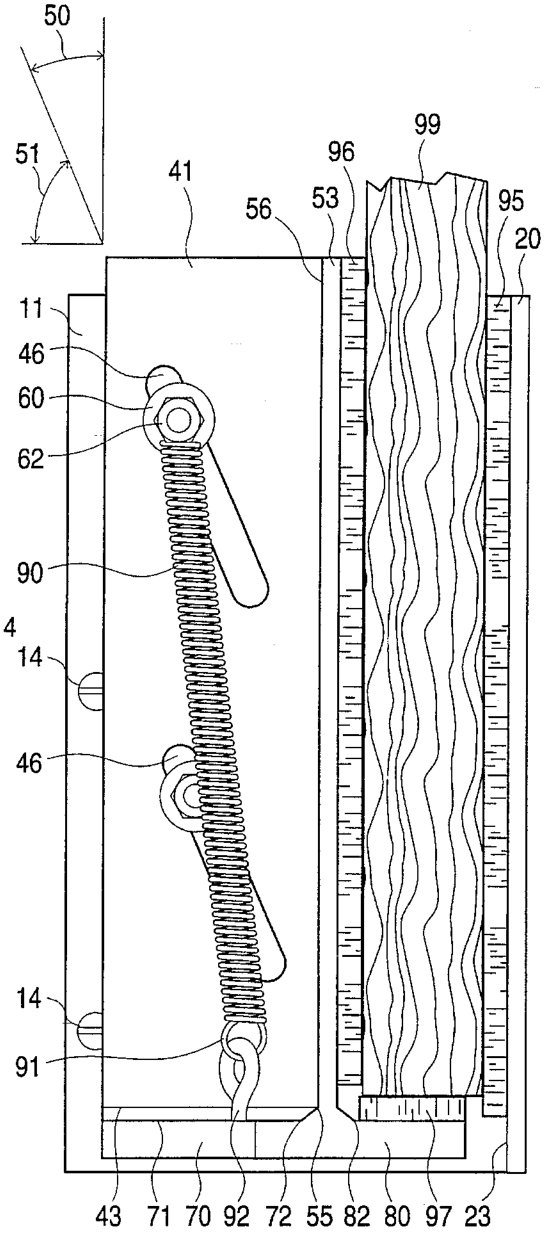
FIG. 4 is a front view of a clamping device for holding doors, panels and the like in an upright position representing the present invention in the actuated, closed position, with a generally planar workpiece shown as grippingly engaged thereby.

Referring now to the drawings for a detailed description of the present invention, reference is first made to FIGS. 1 and 2, depicting rectangular rear stationary plate 11, formed from a sturdy, rigid material such as aluminum, having longer rear stationary plate first edge 12, shorter rear stationary plate second edge 13, planar rear stationary plate back surface (not shown) and planar rear stationary plate front surface 15. The present invention may be attached to a vertical, generally planar attachment surface of either a stationary support such as a workbench or post, or, to a movable support, such as the outside face of wood toolbox 10 as shown in FIG. 1. Attachment of the present invention to toolbox 10 is made by wood screws 14 as shown in FIGS. 3 and 4, attached through countersunk holes 16 as shown in FIG. 2, so that rear stationary plate 11 is attached to toolbox 10 with rear stationary plate back surface adjacent to toolbox 10, and rear stationary plate first edge 12 is vertically disposed. By attachment to toolbox 10 in this manner, rear stationary plate front surface 15 remains essentially flat and smooth. It will be recognized that wood screws 14 may be replaced by other suitable fasteners in those instances where the material of the attachment surface differs, for instance, by machine screws in the case of a metal tool box. In the event that the attachment surface has a nearby protuberance, such as a latch or lid, spacing washers or the like may be placed between the attachment surface and the rear stationary plate back surface, in order to mount the present invention to the attachment surface without interfering with the protuberance.

As depicted most clearly in FIGS. 2, 3, and 4, rectangular lateral stationary plate 20, also formed of rigid, sturdy material, having longer lateral stationary plate first edge 21, shorter lateral stationary plate second edge 22, and planar lateral stationary plate inside surface 23, is attached, for instance by welding, to rear stationary plate 11 so that lateral stationary plate first edge 21 is adjacent to rear stationary plate first edge 12, rear stationary plate second edge 13 and lateral stationary plate second edge 22 are coplanar, and lateral stationary plate inside surface 23 is disposed normal and adjacent to rear stationary plate front surface 15.

Referring now to FIGS. 1 and 2, rods 30, in the form of machine screws, are disposed through rear stationary plate 11 towards rear stationary plate front surface 15 at countersunk rod holes 31, so that the axes of rods 30 are disposed normal to the plane of rear stationary plate 11 and occupy a vertical plane. A rod bushing 32 is disposed to slidably fit over each rod 30.

As shown in FIGS. 1, 2, 3, and 4, rectangular rear movable plate 41, formed of a rigid, sturdy material, has longer rear movable plate first edge 42, shorter rear movable plate second edge 43, planar rear movable plate back surface (not shown), planar rear movable plate front surface 45, and parallel, linear slots 46 disposed through rear movable plate 41. Each slot 46 has a width slightly greater than the diameter of a rod bushing 32, and forms a first angle 50 with respect to rear movable plate first edge 42 and a complementary second angle 51 with respect to rear movable plate second edge 43. Each rod 30 aligns with one slot 46, so that slots 46 are capable of relative sliding movement with respect to rods 30. First angle 50 is chosen to be in the range of 37 degrees to 14 degrees, so that complementary second angle 51 ranges between 53 degrees and 76 degrees. Selection of first and second angles 50 and 51 in these ranges permits the weight of a door, panel or other similar generally planar workpiece to produce sufficient lateral pressure to hold the workpiece securely in place when the workpiece is placed in the present invention as described below, yet permits the present invention to release the workpiece when the workpiece is raised from the present invention. For a workpiece such as a common door, it has been determined that the optimum values for first angle 50 and second angle 51 are approximately 22 degrees and 68 degrees, respectively.

As depicted most clearly in FIGS. 2, 3, and 4, rectangular lateral movable plate 53, formed of a rigid, sturdy material, having longer lateral movable plate first edge 54, shorter lateral movable plate second edge 55, planar lateral movable plate first surface 56 and planar lateral movable plate second surface 57, is attached, for instance by welding, to lateral rear movable plate 41 so that lateral movable plate first edge 54 is adjacent to rear movable plate first edge 42, rear movable plate second edge 43 and lateral movable plate second edge 55 are coplanar, and lateral movable plate first surface 56 is disposed normal and adjacent to rear movable plate front surface 45.

As seen in FIGS. 2, 3 and 4, rear movable plate 41 is slidably mounted by flat washers 60, lock washers 61, and nuts 62 to rear stationary plate 11 for relative diagonal movement, with each rod 30 projecting through one of slots 46 and rear movable plate back surface slidably contacting rear stationary plate front surface 15. With respect to the topmost rod 30, interposed between flat washer 60 and and lock washer 61 is spring bushing 63 and spring retainer 64.

Referring to FIGS. 1, 2, 3, and 4, base plate 70, also formed of a sturdy, rigid material, having straight base plate first edge 71 disposed at a right angle to straight base plate second edge 72, is attached, for instance by welding, to rear movable plate 41 and lateral movable plate 53 so that the plane of base plate 70 is normal to rear movable plate front surface 45 and lateral movable plate front surface 56, base plate first edge 71 is attached to rear movable plate second edge 43 and base plate second edge 72 is attached to lateral movable plate second edge 55. Support plate 80, also formed of a sturdy, rigid material, having straight support plate first edge (not shown) disposed at a right angle to straight support plate second edge 82, is attached, for instance by welding, to base plate 70 and lateral movable plate 53 so that support plate 80 and base plate 70 are coplanar, support plate first edge is collinear with rear movable plate second edge 43 and support plate second edge 82 is attached to base plate second edge 72 and lateral movable plate second edge 55.

As shown most clearly in FIG. 2, coil spring 90 is attached to base plate 70 by way of eyelet hook 91 at spring first end 92, and is attached to the topmost rod 30 with spring second end 93 surrounding spring bushing 63 and held between flat washer 60 and spring retainer 64. With reference to to FIGS. 1, 2, 3, and 4, flexible, resilient lateral stationary plate pad 95 is attached, for instance with a suitable adhesive, to lateral stationary plate inside surface 23, and similarly, flexible, resilient lateral movable plate pad 96 is attached to lateral movable plate second surface 57 and flexible, resilient support plate pad 97 is attached to support plate 80 proximate to lateral movable plate 53.

In use, the present invention is attached to a vertical planar surface such as a tool box, although as noted, attachment may be made to any other portable or stationary object having an appropriate vertical planar surface. As shown in FIGS. I and 3, the present invention is normally maintained in an open, unactuated position where rear movable plate 41, lateral movable plate 53, base plate 70, and support plate 80 are urged generally upward and away from lateral stationary plate 20 by spring 90. In this position, rods 30 are disposed at the ends of slots 46 proximate to base plate 70. Referring to FIGS. 3 and 4, the present invention automatically clamps a panel workpiece 99 when panel workpiece 99 is placed in contact with support plate pad 97 and lateral movable plate pad 96. The automatic clamping of the present invention occurs as the weight of panel workpiece 99 upon support plate 80 causes rear movable plate 41 to diagonally slide with respect to rear stationary plate 11 as determined by relative movement of slots 46 with respect to rods 30, until panel workpiece 99 comes into contact with lateral stationary plate pad 95. As noted, first angle 50 should preferably range between 37 degrees and 14 degrees and complementary second angle 51 should range between 53 degrees and 76 degrees. In this way, the weight of panel workpiece 99 acting against support plate 80 causes to lateral movable plate 53 to produce sufficient pressure against panel workpiece 99 and lateral stationary plate 20 to hold panel workpiece 99 securely in place. Coil spring 90 is selected so that the force that coil spring 90 exerts in urging lateral movable plate 53 away from lateral stationary plate 20 is small in comparison to the opposing force produced when panel workpiece 99 is placed in contact with support plate pad 97 and lateral movable plate pad 96.

When operations on panel workpiece 99 have been completed, panel workpiece 99 is grasped and raised generally upward. As weight is removed from support plate 80, coil spring 90 causes rear movable plate 41 to diagonally slide with respect to rear stationary plate 11, with lateral movable plate 53 moving diagonally away from lateral stationary plate 20, until rods 30 contact the lower ends of slots 46, so that the present invention returned to the open, unactuated position.

The present invention having been described in its preferred embodiment, it is clear that it is susceptible to numerous modifications and embodiments within the ability of those skilled in the art and without the exercise of the inventive faculty.

What is claimed is:

1. Clamping device for holding a generally planar workpiece in an upright position, for attachment to a vertical planar attachment surface comprising:

a stationary member having a planar rear portion and a planar lateral portion, said rear portion including a planar back surface and a planar front surface and disposed normal to said lateral portion;

means for attaching said stationary member to said attachment surface so that said back surface is adjacent to said attachment surface and said lateral portion is vertical;

a plurality of rods attached to said rear portion proximate to said lateral portion, so that the axes of said rods are normal to the plane of said rear portion;

a plurality of rod bushings, each slidably disposed surrounding one of said rods and proximate to said rear portion;

a movable member having a planar first portion, a planar second portion, a lower edge, and a plurality of linear slots, said first portion disposed normal to said second portion, and each of said slots disposed through said first portion, having a width slightly greater than the exterior diameter of one of said rod bushings, forming an acute angle with respect to the plane of said second portion so that the ends of said slots proximate to said second portion are proximate to said lower edge, and aligning with one of said rods;

a planar support member attached to said second portion proximate to said lower edge so that said support member is normal to said first and second portions and projects opposite to said first portion;

means for attaching said movable member to said stationary member so that each of said rods projects through and is capable of relative sliding movement with respect to one of said slots, said first portion slidably contacts said front surface, and said second portion is parallel to said lateral portion; and means for urging said second member generally away from said lateral member.

2. Clamping device for holding a generally planar workpiece in an upright position as defined in claim 1 wherein said acute angle is in the range of 14 degrees to 37 degrees.

3. Clamping device for holding a generally planar workpiece in an upright position as defined in claim 1 wherein said means for urging said second member generally away from said lateral member comprises:

a coil spring having a spring first end and a spring second end;

means for attaching said spring first end to said movable member; and means for attaching said spring second end to one of said rods.

4. Clamping device for holding a generally planar workpiece in an upright position as defined in claim 1, further comprising:

a flexible, resilient stationary member pad attached to said lateral portion proximate to said second portion;

a flexible, resilient movable member pad attached to said second portion proximate to said lateral portion; and a flexible, resilient support member pad attached to said support member proximate to said second portion.

5. Clamping device for holding a generally planar workpiece in an upright position as defined in claim 1, wherein the axes of said rods are vertically coplanar.

6. Clamping device for holding a generally planar workpiece in an upright position, for attachment to a vertical planar attachment surface comprising:

a stationary member having a planar rear portion and a planar lateral portion, said rear portion including a planar back surface and a planar front surface and disposed normal to said rear portion;

means for attaching said stationary member to said attachment surface so that said back surface is adjacent to said attachment surface and said lateral portion is vertical;

a plurality of rods attached to said rear portion proximate to said lateral portion, so that the axes of said rods are vertically coplanar and normal to the plane of said rear portion;

a plurality of rod bushings, each slidably disposed surrounding one of said rods and proximate to said rear portion;

a movable member having a planar first portion, a planar second portion, a lower edge, and a plurality of linear slots, said first portion disposed normal to said second portion, and each of said slots disposed through said first portion, having a width slightly greater than the exterior diameter of one of said rod bushings, forming an angle in the range of 14 degrees to 37 degrees with respect to the plane defined by said second portion so that the ends of said slots proximate to said second portion are proximate to said lower edge, and aligning with one of said rods;

a planar support member attached to said second portion proximate to said lower edge so that said support member is normal to said first and second portions and projects opposite to said first portion;

means for attaching said movable member to said stationary member so that each of said rods projects through and is capable of relative sliding movement with respect to one of said slots, said first portion slidably contacts said front surface, and said second portion is parallel to said lateral portion;

a coil spring having a spring first end and a spring second end;

means for attaching said spring first end to said movable member;

means for attaching said spring second end to one of said rods so that said second member is urged generally away from said lateral member;

a flexible, resilient stationary member pad attached to said lateral portion proximate to said second portion;

a flexible, resilient movable member pad attached to said second portion proximate to said lateral portion; and a flexible, resilient support member pad attached to said support member proximate to said second portion.

7. Clamping device for holding a generally planar workpiece in an upright position, for attachment to a vertical planar attachment surface comprising:

a rectangular rear stationary plate having a longer rear stationary plate first edge, a shorter rear stationary plate second edge, a planar rear stationary plate back surface and a planar rear stationary plate front surface;

means for attaching said rear stationary plate to said attachment surface so that said rear stationary plate back surface is adjacent to said attachment surface, and said rear stationary plate first edge is vertical;

a rectangular lateral stationary plate, having a longer lateral stationary plate first edge, a shorter lateral stationary plate second edge, and a planar lateral stationary plate inside surface, attached to said rear stationary plate so that said lateral stationary plate first edge is adjacent to said rear stationary plate first edge, said rear stationary plate second edge and said lateral stationary plate second edge are coplanar, and said lateral stationary plate inside surface is normal and adjacent to said rear stationary plate front surface;

a plurality of rods attached to said rear stationary plate proximate to said rear stationary plate front surface, so that the axes of said rods are coplanar and normal to said rear stationary plate front surface;

a plurality of rod bushings, each slidably disposed surrounding one of said rods and proximate to said rear stationary plate front surface;

a rectangular rear movable plate, having a longer rear movable plate first edge, a shorter rear movable plate second edge, a planar rear movable plate back surface, a planar rear movable plate front surface, and a plurality of parallel linear slots disposed through said rear movable plate, each of said slots having a width slightly greater than the exterior diameter of one of said rod bushings, forming a first angle with respect to said rear movable plate first edge and a complementary second angle with respect to said rear movable plate second edge, and aligning with one of said rods;

a rectangular lateral movable plate, having a longer lateral movable plate first edge, a shorter lateral movable plate second edge, a planar lateral movable plate first surface and a planar lateral movable plate second surface, attached to said rear movable plate so that said lateral movable plate first edge is adjacent to said rear movable plate first edge, said rear movable plate second edge and said lateral movable plate second edge are coplanar, and said lateral movable plate first surface is normal and adjacent to said rear movable plate front surface;

a base plate, having a straight base plate first edge and a straight base plate second edge disposed adjacent and normal to said base plate first edge, attached to said rear movable plate and said lateral movable plate so that the plane of said base plate is normal to said rear movable plate front surface, said base plate first edge is adjacent to said rear movable plate second edge, and said base plate second edge is adjacent to said lateral movable plate second edge;

a support plate, having a straight support plate first edge and a straight support plate second edge disposed adjacent and normal to said support plate first edge, attached to said base plate and said lateral movable plate so that said support plate and said base plate are coplanar, said support plate first edge is collinear with said rear movable plate second edge, and said support plate second edge is adjacent to said base plate second edge and said lateral movable plate second edge;

means for attaching said rear movable plate to said rear stationary plate so that each of said rods projects through and is capable of relative sliding movement with respect to one of said slots, and said rear movable plate back surface slidably contacts said rear stationary plate front surface; and means for urging said lateral movable plate generally away from said lateral stationary plate.

8. Clamping device for holding a generally planar workpiece in an upright position as defined in claim 7, wherein said first angle is approximately 22 degrees and said second angle is approximately 68 degrees.

9. Clamping device for holding a generally planar workpiece in an upright position as defined in claim 8, wherein said means for urging said lateral movable plate generally away from said lateral stationary plate comprises:

a coil spring having a spring first end and a spring second end;

means for attaching said spring first end to the planar surface of said base plate so that said spring is proximate to said rear movable plate and said lateral movable plate; and means for attaching said spring second end to one of said rods.

10. Clamping device for holding a generally planar workpiece in an upright position as defined in claim 9, further comprising:

a flexible, resilient lateral stationary plate pad attached to said lateral stationary plate inside surface;

a flexible, resilient lateral movable plate pad attached to said lateral movable plate second surface; and a flexible, resilient support plate pad attached to said support plate proximate to said lateral movable plate second surface.

11. Clamping device for holding a generally planar workpiece in an upright position as defined in claim 10 wherein the plane defined by the axes of said rods is vertical.

* * * * *